United States Patent Office

2,800,450
Patented July 23, 1957

2,800,450

LUBRICATING COMPOSITIONS

Arnold A. Bondi, Oakland, and Hyman Diamond, Berkeley, Calif., assignors to Shell Development Company, New York, N. Y., a corporation of Delaware No Drawing. Application May 10, 1954,
Serial No. 428,807

10 Claims. (Cl. 252—32.7)

This invention relates to lubricating compositions which are particularly resistant to corrosion and oxidation deterioration over a wide temperature range.

It has been observed that certain classes of non-ash-forming polymeric materials possess excellent detergent and anti-wear properties. Such polymers have a long linear hydrocarbon backbone chain and attached thereto in a uniform or random fashion suitable polar groups and non-polar groups of at least 8 and preferably of at least 16 carbon atoms such as $C_{10}$–$C_{40}$ hydrocarbyl (alkyl, alicyclic, alkaryl and aralkyl) radicals represented schematically as follows:

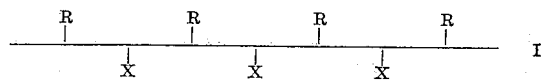
I wherein R is a hydrocarbyl radical and X is a polar group which contains a non-metallic negative atom from groups V and VI of the periodic table and the horizontal line represents the hydrocarbon backbone of the polymer. Particularly suitable polymers of this type can be represented by the formula:

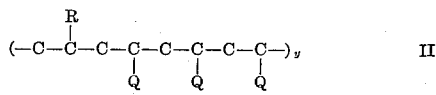
II wherein R is a $C_{16}$ or higher straight-chain alkyl radical; Q is a hydroxyl, hydroxymethyl, cyano, amino, aminomethyl, carbamyl or heterocyclic nitrogen base radical and y is at least 20 and preferably varies from 20 to 80 units.

Although polymers of the type mentioned above and which will be described hereinafter in detail impart excellent detergent and wear inhibiting properties when added in minor amounts to lubricants, they are corrosive to certain metals, particularly copper, and are unstable when subjected to extremely high temperature oxidation conditions such as encountered in various types of engines and equipment operating under heavy loads and high temperatures.

A principal object of the present invention is to inhibit the corrosive tendencies of polymeric compounds of this invention toward metals, particularly toward copper. Another object of the invention is to produce an improved lubricant which is resistant to oxidation under wide temperature conditions. Still another object of the invention is to produce an ashless lubricating composition having excellent detergent, wear, corrosion and oxidation-resistant properties.

It has now been discovered that the above and other objectives can be attained by adding to a lubricating oil (1) a minor amount of from about 0.01% to 10% and preferably from 0.1% to 5% of an oil-soluble polar-containing polymeric compound of the type mentioned and which will be described in detail below; and (2) a corrosion and oxidation stabilizing amount of from 0.01% to about 5% of an organic compound containing a radical of a phosphorus acid and/or a sulfur-containing compound such as organic sulfides, sulfonates, etc.

The polymeric compounds used to improve lubricating oils of this invention as mentioned above are highly branched oil-soluble organic polar and nonpolar groups uniformly or randomly attached to separate and at least about one-half of the carbon atoms of the chain; thus, with a 1:1 ratio of polar and non-polar groups each quadruplet or unit of four carbon atoms of the chain on the average has attached to one of the carbon atoms thereof a polar group and to another carbon atom thereof a nonpolar group. Similarly, with a 2:1 ratio of polar to non-polar groups each unit of six carbon atoms of the chain on the average has attached to three of the carbon atoms thereof two polar groups and one non-polar group.

The essential nonpolar substituent groups or radicals are oil-soluble (oleophilic) and preferably are hydrocarbon radicals of from about 8 to about 40 carbon atoms. The essential polar groups are functional radicals which contain a non-metallic negative atom from groups V and VI of the periodic table, such as N, P, O and S, and preferably is such a non-metallic polyvalent atom having an atomic number of from 7 to 8. Such polar groups are representable by —N—R—N—XR, —CXXH, —CN, —SCN, —NR$_2$, —COONHR$_2$ and —CONR$_2$, R being hydrogen or a hydrocarbon radical and X is O or S with preferred polar groups being —OH, —COOH, —CN, —CONR$_2$, —NH$_2$ and the like. Other nonpolar groups, such as low molecular weight hydrocarbon radicals and other polar groups or atoms, such as halogen atoms, e. g., fluorine, chlorine and bromine atoms, may be attached to other carbon atoms of the hydrocarbon chain. The ratio of the number of essential polar groups to the number of essential non-polar groups can vary within relatively wide limits, e. g., from 1/5 to 5/1 and preferably from 1/1 to 4/1. The compound, or mixture of such compounds as will normally be employed, should have a molecular weight or be made up of molecules essentially having molecular weights of at least 1,500, generally varying from 3,000 to 50,000, and preferably from about 4,000 to about 20,000.

The compounds to be used in accordance with the invention are suitably prepared as hydrolyzed or alcoholized copolymers of alpha-olefinic hydrocarbons, such as alpha-alkenes, containing from 10 to about 40 carbon atoms, preferably 12 to 30, with hydrolyzable vinyl compounds, such as vinyl halides (vinyl chloride) and vinyl esters (vinyl acetate), or as copolymers of such alpha-olefins with other low molecular weight polymerizable polar-substituted alpha-alkenes, such as the acrylo compounds, as illustrated by acrylic acid, acrylonitrile, acrylamide, methacrylic acid, methacrylonitrile, methacrylamide, as well as mixtures and derivatives thereof. By alpha-olefinic hydrocarbons is meant herein hydrocarbons which contain a terminal —CH=CH$_2$ group.

In forming the copolymers of this invention the polymer may be so prepared so that the oil-insoluble alkyl radical and the polar radicals are randomly distributed throughout the finished product. If desired, however, polymerization can be so controlled so that the polar radicals and oil solubilizing hydrocarbyl radicals are uniformly distributed in the finished product. Thus, in the former case the polymer is of the type represented by Formula 1 but wherein the radicals R and X are randomly distributed in the finished polymeric product. The Formula II represents a polymeric compound where uniform distribution of the radicals under discussion occurs.

In the formation of the polymeric compounds to be used in this invention, one of the essential reactants is an alpha-olefin (normal or branched-chain) containing at least 10 carbon atoms. These alpha-olefins can have from 10 to 40 carbon atoms, the alpha-olefins containing from 12 to 30 carbon atoms being preferred. Illustrative to such olefins are the normal alpha-olefins as follows: decene, hendecene (undecene), dodecene, tridecene, tetradecene, pentadecene, hexadecene, heptadecene, octadecene, nonadecene, eicosene, heneicosene, docosene, tricosene, tetracosene, pentacosene, hexacosene, heptacosene, octacosene, nonacosene, triacontene, hentriacontene, dotriacontene, tritriacontene, tetratriacontene, pentatriacontene, hexatriacontene, heptatriacontene, octatriacontene, nonatriacontene, tetracontene, pentacontene, hexacontene, and heptacontene. These olefinic materials can be obtained for example by cracking paraffin waxes, as is well known in the art.

The polar-containing polymerizable compound utilized in the copolymerization should contain the polar radical which it is desired to have in the finished product, or it should contain a polar radical or group which after copolymerization is readily convertible, as by hydrolysis, oxidation, reduction, amidation or dehydration, or other suitable reaction, to the desired polar group. This polar group should be attached directly to one of the ethylenic carbon atoms or to such ethylenic carbon atoms through a single carbon atom.

In the formation of polyol compounds to be used in the oil compositions, as by hydrolysis of, for example, suitable copolymers of alpha-alkenes with a suitable vinyl compound, the vinyl compound is suitably an ester of lower molecular weight acids, such as vinyl formate, vinyl acetate, vinyl propionate, vinyl butyrate, vinyl benzoate, etc., or a vinyl halide, such as vinyl chloride. Other copolymers of this invention can be formed by reacting the alpha-olefins with acrylo compounds containing a polar functional group, such as acrylonitrile, acrylamide, acrylic acid and homologs thereof, e. g., methacrylonitrile, alpha-ethylacrylonitrile, alpha-propylacrylonitrile, 2-butyl-2-hexenenitrile, 2-propyl-2-pentenenitrile, 2-chloroethyl-2-butenenitrile, 2-ethyl-3-chloro-2-butenenitrile, 2-isopropyl-3-bromo-2-pentenenitrile, alpha-isopropyl-beta-cyclohexyl-acrylonitrile, corresponding amides and the like.

Since the ratio of polar to nonpolar groups in the compounds to be used in the oil composition of the invention can be varied, the ratio of molar proportions of the reactants can be varied over wide limits such as from 0.1 to 10, preferably, from 0.5 to 5 of the polar olefinically polymerizable compound to the essential nonpolar alpha-olefin.

Normally, these reactants are copolymerized in the presence of a catalyst. The catalysts suitable for use in making these copolymers include various oxygen-yielding catalysts, for example, various organic peroxides, such as aliphatic, aromatic, heterocyclic and alicyclic peroxides such as diethyl peroxide, tertiary butyl hydroperoxide, dibenzoyl peroxide, dimethylthienyl peroxide, dicyclohexyl peroxide, dilauroyl peroxide and urea peroxide. These are mentioned by way of nonlimiting examples of organic peroxides suitable for use in the preparation of additives for use in compositions of this invention. Other catalysts include sodium bisulfite, diethyl sulfoxide, ammonium persulfate, alkali metal perborates, azo compounds such as alpha, alpha-azodiisobutyronitrile, etc.

Copolymers of this invention can be prepared by any suitable means, such as described in U. S. Patents 2,421,971 and 2,467,774. They may also be produced by the method described in U. S. Patent 2,551,643, followed by hydrolyzing the copolymer by the method described in the first two patents. Suitable copolymers also can be prepared by the method described in U. S. Patents 2,421,971 and 2,467,774 except that for vinyl esters, acrylonitriles, acrylamides or acrylic acids are used or these copolymers can be prepared by the general method described in U. S. Patents 2,436,926 and 2,486,241.

The following examples are given as illustrative of suitable compounds and of their preparation:

*Example I.—Hydrolysis product of alpha-octadecene-vinyl acetate copolymer*

About 1 mole of vinyl acetate and 1.2 moles of alpha-n-octadecene were thoroughly mixed, a small amount of benzoyl peroxide was added to the mixture and the resulting mixture placed in a glass bomb from which air was displaced by nitrogen. The bomb was placed in a water bath maintained at around 80° C. for a period of about 24 hours. The product was topped to 170° C. at 2 mm. of Hg pressure and on analysis the residue had an ester value of 0.491 gram-equivalents of ester groups per 100 grams of sample.

This product was alcoholized in about 1,800 ml. of methanol to which about 1 gram of metallic sodium was added. The mixture was distilled to remove the methyl acetate and the excess methanol and the product was then dispersed in heptane and topped. The resulting residue product was an alkanepolyol (polyhydric alkanol) having a molecular weight of about 8,000 as determined by light scattering means. From the molecular weight and the aforesaid number of gram equivalents of ester group per 100 grams of the ester, it can be calculated that for the alkanepolyol there is a ratio of alcoholic hydroxyl groups to hydrocarbyl (hexadecyl) radicals of about 2.2. Furthermore, the average alkanepolyol molecule contains about 50 hydroxyethylene radicals and about 23 octadecylene-1,2 radicals; there is a total of about 73 hydrocarbyl and hydroxyl radicals per molecule. In other words, the molecule is a chain of 146 C-atoms having 50 hydroxyl and 23 hexadecyl radicals attached to 73 different C-atoms of the chain throughout the chain length. Those 73 C-atoms having attached thereto 73 H-atoms (one each) and the remainder of the C-atoms being saturated with 2 H-atoms each. The molecule can be represented by the formula

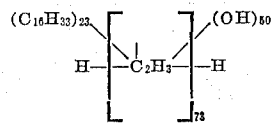

*Example II.—Hydrolysis product of alpha-hexadecene-vinyl acetate copolymer*

This copolymer was prepared in accordance with the method of Example 1 except that alpha-n-hexadecene was used. The hydrolyzed copolymer was oil-soluble, had a molecular weight of 6,000 to 8,000, an average ratio of 2 units of hydroxyethylene per unit of hexadecene-1,2 and had good detergent properties.

Other alkanepolyol products suitable for use in this invention include the hydrolyzed (alcoholized) copolymers having molecular weights ranging from 6,000 to 12,000 and resulting from the following copolymers:

Alpha-heptadecene-vinyl acetate
Alpha-tetradecene-vinyl acetate
Alpha-eicosene-vinyl acetate
Alpha-octadecene-vinyl proprionate
Alpho-octadecene-vinyl butyrate
Alpha-octadecene-vinyl benzoate
Mixture of alpha-tetradecene and octadecene-vinyl acetate
Cracked wax C8–C14 alpha-olefin mixture-vinyl acetate
Alpha-docosene-vinyl acetate

*Example III.—Copolymer of alpha-octadecene and acrylonitrile*

This copolymer was prepared by reacting about 4 moles of alpha-n-octadecene with about 1 mole of acrylonitrile in the presence of 2,2-bis(tert-butyl)peroxy-butane as catalyst, in a bomb (from which air was displaced with nitrogen) by heating said bomb in an oil bath at 110° C. for about 16 hours. The product was filtered and washed with heptane to yield an oil-soluble copolymer product. The partially hydrogenated derivative (25%–75% hydrogenation) of this copolymer, being a mixture of polycyanopolyaminomethylalkanes, imparts improved anti-wear properties to an oil when added thereto.

*Example IV.—Copolymer of alpha-octadecene and acrylic acid*

This copolymer was prepared in accordance with the process of Example III, except that acrylic acid was used instead of acrylonitrile.

*Example V.—Copolymer of alpha-octadecene and acrylamide*

About 4 moles of alpha-n-octadecene and a catalytic amount of 2,2 bis(tert-butyl)peroxy-butane was admixed. To this mixture was added about 1 mole of acrylamide in acetone and the entire mixture was placed in a steel bomb from which air was displaced with nitrogen, and the sealed bomb was heated in an oil bath at 110° C. for about 16 hours. The acetone was removed by topping and the product was filtered and washed with heptane. The heptane was removed by topping at 170° C. under 2 mm. pressure.

Other polycyano-, polycarbamyl- and polycarboxylalkanes useful in the present invention are preparable as the following copolymers of molecular weights of from 6,000 to 12,000:

Alpha-heptadecene-acrylonitrile
Alpha-tetradecene-acrylonitrile
Alpha-octadecene-methacrylonitrile
Alpha-octadecene-alpha-ethylacrylonitrile
Alpha-eicosene-acrylonitrile
Alpha-tetradecene-acrylamide
Cracked wax $C_{14}$–$C_{18}$ alpha-olefin mixture-acrylamide
Alpha-paraffin wax olefin-acrylic acid
Mixture of alpha-octadecene and alpha-tetradecene-acrylonitrile The second essential additive used in compositions of this invention is an organic compound containing an inorganic phosphorus acidic radical and/or organic sulfides or sulfonates. Compounds of the first type can be obtained by reacting mono- or polyhydroxy or mercapto organic compounds, aliphatic olefins, e. g., isobutylene, cyclic olefins, e. g., terpenes, and mixtures thereof, with $P_2O_5$, $POCl_3$, $P_2S_5$, $PSCl_3$ or $P_2Se_5$; salts of said products are also included and are obtained by neutralizing the reaction products mentioned with oxides, hydroxides, carbonates, or halides of alkali, mono- or polyvalent metals such as the alkali, alkaline earth or heavy metals exemplified by Na, K, Ca, Ba, Sr, Mg, Al, Co, Pb, Ni and Fe, to form the corresponding salts and mixtures thereof. Compounds of this type include salts such as Na, Ca, Ba, Zn and Al salts of alkyl, alkaryl, aralkyl, cycloalkyl, aryl phosphates, thiophosphates and specifically illustrated by Na, K, Ca, Ba, Zn and Al salts of methylcyclohexyl phosphate, dimethylcyclohexyl dithiophosphate, dihexyl acid thiophosphate, lauryl benzyl thiophosphate, butyl trichloromethanephosphonic acid; $P_2S_5$-olefin reaction product as described in U. S. Patents 2,316,080; 2,316,082; 2,316,086; 2,261,047; 2,540,084; 2,358,305; 2,466,408; 2,344,393; 2,493,217 and 2,662,856 as well as the non-salt or non-neutralized products such as $P_2S_5$-terpene reaction products and mixtures thereof. Compounds of this type are available commercially under the trade names of Lubri-Zol 304 (Lubri-Zol Corp.); Aerolube 70 (American Cyanamid Co.); Stan-Add 48 (Standard Oil Co. of Indiana) and Santolube 394C (Monsanto Chemical Co.). Other phosphorus compounds which can be used are of the type described by Smalheer et al. in Petroleum Processing, December 1952. A particularly preferred list of such compounds includes the Zn and Ba salts of dimethylcyclohexyl dithiophosphate, Na, K and Ba salts of $P_2S_5$-polybutene reaction products and/or $P_2S_5$-terpene (pinene) reaction products, said products being commercially available from Lubri-Zol Corporation, Standard Oil Company of Indiana and Monsanto Chemical Company, respectively, under the trade names of Lubri-Zol 304 and Lubri-Zol 728; Stan-Add 47, 48 and L-9103; and Santolube 394-C.

Specific examples of reaction products under discussion and their detailed method of preparation are as follows.

About 4 moles of gum spirits of turpentine was heated under agitation to around 250° F., and about 1 mole of $P_2S_5$ was added portionwise maintaining the temperature of the mixture around 250° F. until all of the $P_2S_5$ had been added. The temperature was then increased to 275–300° F. and the mixture reacted until evolution of $H_2S$ ceased. On analysis the product contained 12.8% S and 4.81% P.

Another product was prepared by heating 4 moles of alpha-pinene with 1 mole of $P_2S_5$ at around 240° F. until all of the $P_2S_5$ had been added and thereafter increasing the reaction temperature to around 300° F. and maintaining the mixture at said temperaure until the reaction was completed. On analysis the product contained 12.7% S and 4.62% P.

The phosphorus-sulfur compounds of the type described can be also prepared by reacting an organic compound such as olefin polymers or alkyl phenols with a sulfur halide such as sulfur chloride and then with a phosphorus compound such as $P_2O_5$.

Instead of phosphorus compounds, organic sulfides such as alkyl and/or aryl sulfides or selenides of which preferred are the aryl sulfides such as ethylene bis(tolyl sulfide), 2,5-dimethylhexane-2,5-bis(p-tolyl sulfide), amidophenyl hydroxyphenyl sulfide, bis(amidophenyl)disulfide, bis(pentadecylphenol)disulfide, bis-phenol sulfide, bis(o-phenylthiophenol)disulfide, dilauryl sulfide, wax disulfide, dilauryl selenide, and the like. If desired the sulfides can be replaced wholly or in part by salts or organic sulfonic acids such as metal salts (Na, Ca, Ba, Ni, Zn, Al), petroleum sulfonic acid, tetratertiary butyl naphthalene sulfonic acid, diwax benzene sulfonic acid, diisobutylene phenol sulfonic acid, and mixtures thereof.

The additive combination of this invention is effective to provide improved lubricants based on various oleophilic lubricating media, such as natural and synthetic hydrocarbon lubricating oils.

The base for additives of this invention can be any natural or synthetic material having lubricating properties. Thus, the base may be a hydrocarbon oil of wide viscosity range, e. g., 100 SUS at 100° F. to 150 SUS at 210° F. The hydrocarbon oils may be blended with fixed oils such as castor oil, lard oil and the like, and/or with synthetic lubricants such as polymerized olefins, copolymers of alkylene glycols and oxides; organic esters of polybasic organic and inorganic acids, e. g., di-2-ethylhexyl sebacate, dioctyl phthalate, trioctyl phosphate; polymeric tetrahydrofuran; polyalkyl silicone polymers, e. g., dimethyl silicone polymer and the like. If desired, the synthetic lubricants may be used as the sole base lubricant or admixed with fixed oils and their derivatives.

Mineral lubricating oils which are particularly desirable for use in compositions of this invention and which have been used as a base for the test compositions were obtained from West Texas Ellenburger crudes and a refined oil therefrom and had the following properties:

Gravity, ° API _____ Min. 26.5.
Pour point, ° F _____ Max. 10.
Flash, COC, ° F _____ Min. 490.
Viscosity, SUS, at 210° F _____ 120–125.
Viscosity index _____ Min. 95.

Another such oil is an SAE 30 mineral oil having the following properties:

Gravity, ° API _____ Min. 24.5.
Pour point, °F _____ Max. −5.
Flash, COC, ° F _____ Min. 415.
Viscosity, SUS, at 210° F _____ 60–63.
Viscosity index _____ 50–60.

In order to demonstrate the useful properties of lubricants of this invention, including the prevention of valve sticking, of scuffing, of sludging, and of wear corrosion and the inhibition of oxidation, particularly under high temperature conditions, various tests were made on lubricants of the invention with results being obtained, all as presented hereinbelow.

COMPOSITIONS TESTED

[Compositions A–H of the present invention; compositions 1–4 are comparative compositions]

A. Mineral oil+1% copolymer of Ex. I+1.4% $P_2S_5$-pinene reaction product
B. Mineral oil+2% copolymer of Ex. I+1.4% Zn dimethyl cyclohexyl dithiophosphate
C. Mineral oil+2% copolymer of Ex. I+1.4% of a mixture of $P_2S_5$ terpene reaction product and Zn dimethyl cyclohexyl dithiophosphate
D. Mineral oil+1% copolymer of Ex. III+1.4% $P_2S_5$-pinene reaction product
E. Mineral oil+2% copolymer of Ex. I+1% ethylene bis(tolylsulfide)
F. Mineral oil+2% copolymer of Ex. I+0.5% Ca petroleum sulfonate
G. Mineral oil+1% copolymer of Ex. III+0.5% calcium petroleum sulfonate
H. Mineral oil+1% copolymer of Ex. III+1% diphenol sulfide
1. Mineral oil+2% copolymer of Ex. I
2. Mineral oil+2% copolymer of Ex. III
3. Mineral oil+1.4% $P_2S_5$-pinene reaction product
4. Mineral oil.

| Test | Reference |
| --- | --- |
| I. High Temperature Oxidation Test $k$ (reaction velocity constant) AER (anti-oxidant effectiveness ratio). | Ind. and Eng. Chem., Vol. 44, 1834, 1952. |
| II. Thrust Bearing Corrosion and Oxidation Test (A=oxygen absorption time in hours, 150 ml. $O_2$, 150° C.; B=average corrosion rate mg. cm.$^{-2}$ hr.$^{-1}$). | National Petroleum News, Sept. 17, 1941, pp. 294–296. |
| III. L–3 Engine Test (Piston lacquer ratio 10=clean). | CRC Handbook. |
| IV. Cadillac Scuffing Test. | Conditions: No load, 2,000 R. P. M.; 100° F. jacket temp., time 20 hrs; valve spring load 220 pounds; condition of hydraulic valve lifters and cam wear at end of test noted. |

RESULTS

| Composition | Tests | | | | | | |
| --- | --- | --- | --- | --- | --- | --- | --- |
| | I | | | II | | III | IV |
| | Time to Absorb 250 ml. $O_2$ per 100 cm.$^3$ min. | $k$ | AER | A | B | | Steel Lifters | Hardened Cast Iron Lifters |
| A | 43.3 | 6.0 | 8.65 | 80 | 0.0016 | | | |
| B | | | | | 0.006 | 8.5 (150 hrs.). | No Pitting. | No Scuffing. |
| C | | | | | | 8.5 (150 hrs.). | | |
| D | | 8.6 | 8.6 | | | | | |
| E | | 9.65 | | | | | | |
| F | | 6.6 | | | | | | |
| G | | | 5.4 | | | | | |
| H | | | 12.6 | | | | | |
| 1 | 4.9 | 55.7 | 1 | 10 | 0.49 | 6 (125 hrs.). | Pitting severe. | Scuffing. |
| 2 | | 49.4 | 1 | | | | | |
| 3 | 30.2 | | | | | | | |
| 4 | 5.0 | 50 | 1 | 10 | 0.1 | 5 (20 hrs.). | Pitting severe. | Scuffing. |

The additive combination of this invention can in addition be used as water-proofing agents and as anti-oxidants in fuels, greases, particularly silica gel greases, in printing inks as resin plasticizers, and many other uses.

We claim as our invention:

1. A lubricating composition comprising a major amount of a mineral lubricating oil from 0.01% to 10% by weight of an oil-soluble hydrolyzed copolymer of an alpha hydrocarbon-olefin having at least 8 carbon atoms with a vinyl ester of a lower fatty acid having from 1 to 5 carbon atoms respectively, in the mol ratio of from 1/1 to 1/5, respectively, said hydrolyzed copolymer product having a molecular weight of from about 1,500 to about 50,000, and from 0.01% to 5% of an oil-soluble organic dithiophosphate.

2. A lubricating composition comprising a major amount of a mineral lubricating oil from 0.01% to 10% by weight of an oil-soluble hydrolyzed copolymer of an alpha hydrocarbon-olefin having at least 8 carbon atoms with a vinyl ester of a lower fatty acid having from 1 to 5 carbon atoms respectively, in the mol ratio of from 1/1 to 1/5, respectively said hydrolyzed copolymer product having a molecular weight of from about 1,500 to about 50,000, and from 0.01% to 5% of a mixture of an oil-soluble salt of an organic dithiophosphate, and a reaction product between phosphorus sulfide and a terpene.

3. A lubricating composition comprising a major amount of a mineral lubricating oil from 0.01% to 10% by weight of an oil-soluble hydrolyzed copolymer of alpha-octadecene with a vinyl ester of a lower fatty acid having from 1 to 5 carbon atoms respectively, in the mol ratio of from 1/1 to 1/5, respectively, said hydrolyzed copolymer product having a molecular weight of from about 4,000 to about 20,000 and from 0.01% to 5% of an oil-soluble metal salt of an organic acid dithiophosphate.

4. A lubricating composition comprising a major amount of a mineral lubricating oil from 0.01% to 10% by weight of an oil-soluble hydrolyzed copolymer of alpha-octadecene with a vinyl ester of a lower fatty acid having from 1 to 5 carbon atoms respectively, in the mol ratio of from 1/1 to 1/5, respectively said hydrolyzed copolymer product having a molecular weight of from about 4,000 to about 20,000 and a mixture of from 0.01% to 5% of an oil-soluble metal salt of an organic acid dithiophosphate and a reaction product of terpene and phosphorus sulfide.

5. A lubricating composition comprising a major amount of a mineral lubricating oil from 0.01% to 10% by weight of an oil-soluble hydrolyzed copolymer of alpha-octadecene with a vinyl ester of a lower fatty acid having from 1 to 5 carbon atoms respectively, in the mol ratio of from 1/1 to 1/5, respectively said hydrolyzed copolymer product having a molecular weight of from about 4,000 to about 20,000, and from 0.01% to 5% of zinc cyclohexyl dithiophosphate.

6. A lubricating composition comprising a major amount of a mineral lubricating oil from 0.01% to 10% by weight of an oil-soluble hydrolyzed copolymer of alpha-octadecene with a vinyl ester of a lower fatty acid having from 1 to 5 carbon atoms respectively, in the mol ratio of from 1/1 to 1/5, respectively said hydrolyzed copolymer product having a molecular weight of from about 4,000 to about 20,000 and from 0.01% to 5% of a reaction product of $P_2S_5$-pinene.

7. A lubricating composition comprising a major amount of a mineral lubricating oil from 0.01% to 10% by weight of an oil-soluble hydrolyzed copolymer of alpha-octadecene with a vinyl ester of a lower fatty acid having from 1 to 5 carbon atoms respectively, in the mol ratio of from 1/1 to 1/5, respectively said hydrolyzed copolymer product having a molecular weight of from about 4,000 to about 20,000 and a mixture of from 0.01% to 5% of zinc cyclohexyl dithiophosphate and a reaction product of $P_2S_5$ and pinene.

8. A lubricating composition comprising a major amount of a mineral lubricating oil from 0.01% to 10% by weight of an oil-soluble hydrolyzed copolymer of alpha-octadecene with vinyl acetate in the mol ratio of from 1/1 to 1/5, respectively, said hydrolyzed copolymer product having a molecular weight of from about 4,000 to about 20,000, and from 0.01% to 5% of a mixture of an oil-soluble metal salt of an organic acid dithiophosphate, and of a reaction product of terpene and phosphorus sulfide.

9. A lubricating composition comprising a major amount of a mineral lubricating oil from 0.01% to 10% by weight of an oil-soluble hydrolyzed copolymer of alpha-octadecene with vinyl acetate in the mol ratio of from 1/1 to 1/5, respectively, said hydrolyzed copolymer product having a molecular weight of from about 4,000 to about 20,000, and from 0.01% to 5% of zinc cyclohexyl dithiophosphate.

10. A lubricating composition comprising a major amount of a mineral lubricating oil from 0.01% to 10% by weight of an oil-soluble hydrolyzed copolymer of alpha-octadecene with vinyl acetate in the mol ratio of from 1/1 to 1/5, respectively, said hydrolyzed copolymer product having a molecular weight of from about 4,000 to about 20,000, and from 0.01% to 5% of a mixture of zinc cyclohexyl dithiophosphate, and of a reaction product of $P_2S_5$ and pinene.

References Cited in the file of this patent

UNITED STATES PATENTS

| | | |
|---|---|---|
| 2,125,851 | Ralston | Aug. 2, 1938 |
| 2,175,092 | Ralston | Oct. 3, 1939 |
| 2,261,047 | Asseff | Oct. 28, 1941 |
| 2,316,090 | Kelso | Apr. 6, 1943 |
| 2,653,133 | Catlin | Sept. 22, 1953 |
| 2,660,563 | Banes et al. | Nov. 24, 1953 |
| 2,662,856 | Bishop | Dec. 15, 1953 |
| 2,698,316 | Giammaria | Dec. 28, 1954 |